US009602950B1

(12) United States Patent
Gonzalez et al.

(10) Patent No.: US 9,602,950 B1
(45) Date of Patent: Mar. 21, 2017

(54) CONTEXT-BASED DATA STORAGE MANAGEMENT BETWEEN DEVICES AND CLOUD PLATFORMS

(71) Applicant: International Business Machines Corporation, Armonk, NY (US)

(72) Inventors: Pablo R. M. Gonzalez, São Paulo (BR); Tiago Pagani, Ipiranga (BR); Krzysztof A. Rudek, Nowy Wisnicz (PL); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/878,389

(22) Filed: Oct. 8, 2015

(51) Int. Cl.
*H04W 8/20* (2009.01)
*H04W 4/00* (2009.01)
*H04W 4/18* (2009.01)

(52) U.S. Cl.
CPC ........... *H04W 4/003* (2013.01); *H04W 4/001* (2013.01); *H04W 4/18* (2013.01)

(58) Field of Classification Search
CPC ............... H04W 4/04; H04M 1/72525; H04M 1/72572; G06F 3/04817
USPC .... 455/414.1–4, 456.1–3, 418–420; 709/203
See application file for complete search history.

(56) References Cited

U.S. PATENT DOCUMENTS

| | | | |
|---|---|---|---|
| 8,606,923 B2 | 12/2013 | Tekwani | |
| 8,818,981 B2 | 8/2014 | Aftab et al. | |
| 2011/0307573 A1 | 12/2011 | Lingafelt et al. | |
| 2012/0015642 A1* | 1/2012 | Seo | G06F 8/65 455/419 |
| 2012/0042036 A1 | 2/2012 | Lau et al. | |
| 2013/0159476 A1 | 6/2013 | Hilburn et al. | |
| 2014/0032645 A1 | 1/2014 | Loetter | |
| 2014/0032647 A1* | 1/2014 | Nimura | H04W 4/001 709/203 |
| 2014/0089449 A1 | 3/2014 | Bhogal et al. | |
| 2015/0065170 A1* | 3/2015 | Brisebois | H04W 4/04 455/456.3 |
| 2015/0347770 A1* | 12/2015 | Whalley | G06F 21/6245 726/30 |

FOREIGN PATENT DOCUMENTS

WO 2014055613 A1 4/2014

OTHER PUBLICATIONS

Badidi et al., "A Cloud-based Approach for Context Information Provisioning", World of Computer Science and Information Technology Journal, 2011, pp. 63-70, vol. 1, No. 3.

(Continued)

*Primary Examiner* — Cong Tran
(74) *Attorney, Agent, or Firm* — Hoffman Warnick LLC (57) ABSTRACT

A system, method and program product that provides context-based data storage management between a cloud platform and a mobile device. A system is disclosed that includes: a system for assigning context to user files stored in a cloud platform; a system for periodically analyzing schedule information and location information associated with a user to determine a current user context; a system for matching the current user context with user files stored in the cloud platform to identify a set of context matching files; and a system for periodically downloading context matching files from the cloud platform to a mobile device associated with the user.

14 Claims, 3 Drawing Sheets

(56) References Cited

OTHER PUBLICATIONS

Stuedi et al., "WhereStore: Location-based Data Storage for Mobile Devices Interacting with the Cloud", Jun. 15, 2010, 8 Pages.
La et al., "A Conceptual Framework for Provisioning Contrext-aware Mobile Cloud Services", 2010. Abstract can be found using the following link: http://dl.acm.org/citation.cfm?id=1845372&CFID=478438712&CFTOKEN=97722654.
Mell et al., "The NIST Definition of Cloud Computing", U.S. Department of Commerce—National Institute of Standards and Technology, Sep. 2011, 7 Pages.

* cited by examiner

CONTEXT-BASED DATA STORAGE MANAGEMENT BETWEEN DEVICES AND CLOUD PLATFORMS

TECHNICAL FIELD

The subject matter of this invention relates to data storage, and more particularly to a system and method of providing context-based data storage management between devices and cloud platforms.

BACKGROUND

Mobile devices are a fundamental part of most peoples' lives, and they are used for working, playing, studying, researching and more. Unfortunately, mobile devices have a limited amount of physical storage (internal memory and memory cards). When free space is required, managing, prioritizing and taking actions on storing different kind of files is a time consuming task for users and it also consumes resources from the mobile devices, such as battery and bandwidth (if it is required to store data remotely). Often, the type of data required will depend on where users are, what day of the week it is, the user's schedule and other variables.

While remote storage facilities or network provisioning platforms, such as cloud platforms, provide flexibility, failing to properly manage data between the device storage and the remote storage leads to cases where the mobile device does not have enough space for the necessary data when needed. Instead, the device may be loaded with a lot of low priority information at a time when more important data is required. Identifying and downloading the necessary information from remote storage can be both confusing and time consuming.

SUMMARY

The present disclosure provides a solution in which a mobile device is monitored such that data can be exchanged automatically between the device and network provisioning platforms (e.g., the cloud) depending on the context of the situation and the user's needs and preferences. The solution utilizes a multi-agent system to detect and take the required actions based on user's schedule, location and the context of the data stored both in the device and the cloud. In this manner, if the device's storage system has reached a certain usage level and more free space is required, the process will delete irrelevant data that is already uploaded in the cloud and download data that will likely be needed in that situation. The present solution thus aims to optimize data storage in mobile devices by exchanging data between the device and the cloud depending on the user's current context.

In addition to analyzing context, the solution may consider the size of the files to be transferred, the device's remaining battery, the internet connection speed and other aspects to assure the most effective transfer of file will occur.

A first aspect provides a context-based data storage management system, comprising: a system for assigning context to user files stored in a network provisioning platform; a system for periodically analyzing schedule information and location information associated with a user to determine a current user context; a system for matching the current user context with user files stored in the network provisioning platform to identify a set of context matching files; and a system for periodically downloading context matching files from the network provisioning platform to a mobile device associated with the user.

A second aspect provides a computer program product stored on computer readable storage medium, which when executed by a computer system, provides context-based data storage management between a network provisioning platform and a mobile device, comprising: program instructions for assigning context to user files stored in the network provisioning platform; program instructions for periodically analyzing schedule information and location information associated with a user to determine a current user context; program instructions for matching the current user context with user files stored in the network provisioning platform to identify a set of context matching files; and program instructions for periodically downloading context matching files from the network provisioning platform to the mobile device associated with the user.

A third aspect provides a method of providing context-based data storage management between a network provisioning platform and a mobile device, comprising: assigning context to user files stored in the network provisioning platform; periodically analyzing schedule information and location information associated with a user to determine a current user context; matching the current user context with user files stored in the network provisioning platform to identify a set of context matching files; and periodically downloading context matching files from the network provisioning platform to the mobile device associated with the user.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
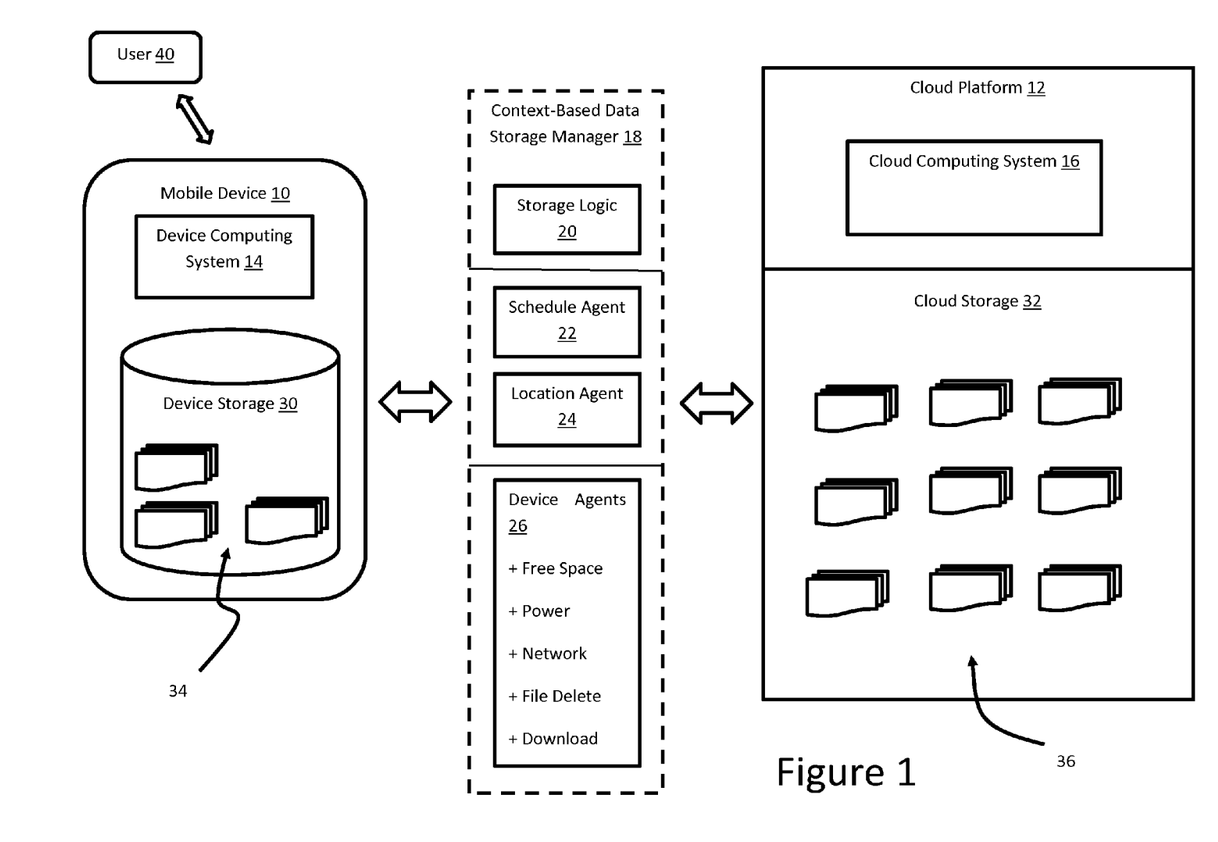
FIG. 1 shows an infrastructure of a context-based data storage management system according to embodiments.

Referring now to the drawings, FIG. 1 depicts an overview of a system for providing context-based data management between a mobile device 10 and a network provisioning platform, such as a cloud platform 12. As shown, mobile device 10 includes a limited amount of device storage 30 for holding a subset of user files 34 generally associated with a user 40 of the mobile device 10. Conversely, cloud platform 12 includes a virtually unlimited amount of cloud storage 32 for holding a complete set of user files 36 associated with the user 40. Mobile device 20 is connectable to cloud platform 12, e.g., via a wireless network, such that files 36 in cloud storage 32 can be downloaded to device storage 30 using known techniques.

In order to ensure that mobile device 10 has the most useful files in the device storage 30, a context-based data storage manager 18 provides a mechanism to automatically download needed files to and delete unneeded files on device storage 30 on a periodic or on-demand fashion. In order to handle this process, context-based data storage manager 18 includes: (1) storage logic 20 for determining, e.g., when files should be downloaded and/or deleted; (2) a schedule agent 22 and a location agent 24 for tracking schedule and location information of the user 40; and a set of device agents 26 that track, e.g., free space, remaining power, network conditions, etc., provide file deleting capabilities, provide download capabilities, etc., on the mobile device 10.

More particularly, storage logic 20 utilizes the user's schedule and user location information to determine a current "context" of the user 40, and then matches the current context of the user 40 with files 36 that share the same (or similar) context. Assuming device parameters, such as free space available, determined by the device agents 26 allow for it, storage logic 20 will automatically (or via a prompt) download one or more context matching (CM) files. For example, if a calendar application associated with user 40 indicates that the user has a meeting at a client site in 30 minutes (as determined by the schedule agent 22), and the location of the mobile device 10 appears to be moving toward the client site (as determined by the location agent 24), then storage logic 20 will determine if there are context matching files (e.g., client related files) that should be available in device storage 30. If context matching files exist, and do not currently reside in the device storage 30, such files can be automatically downloaded from cloud storage 32. If necessary, storage logic 20 can delete lower priority files from the device storage 30 to make room.

In a further example, assume user 40 has a meeting scheduled for 2 pm at a specific location and will need spreadsheets, reports and presentations related to business, and will probably need free space to download or collect more data during the meeting. Assume also that the device 10 has only 10% of remaining storage space. In this scenario, the schedule agent 22 monitoring user's 40 schedule will notice a need for business related data around 2 pm, and the location agent 24 monitoring the device location will confirm that the user 40 is close to the meeting location and thus will probably attend. Storage logic 20 can cause another agent or process to delete files on mobile device 10 that are not relevant for that period and request the necessary files from cloud storage 32.

In order to implement the process, each file 36 is organized in cloud storage 32, e.g., with associated metadata, that for example provides a context, priority, size, etc., of each file. In one embodiment, files 36 may be stored in folders and subfolders that dictate context. For example, folders may be organized by client, investments, entertainment, pictures, studies, etc., which provides the context of the files contained therein. Subfolders may include further granularity. In another embodiment, cloud platform may maintain metadata files associated with each file 36.

Depending on the implementation, context based data storage manager 18 may be implemented by the device computing system 14 of the mobile device 10, by the cloud computing system 16 of the cloud platform 12, on a third party system, or some combination thereof. For example, location agent 22, schedule agent 24 and device agents 26 may reside on the mobile device 10, while storage logic may reside on the cloud platform 12.

Figure 2:
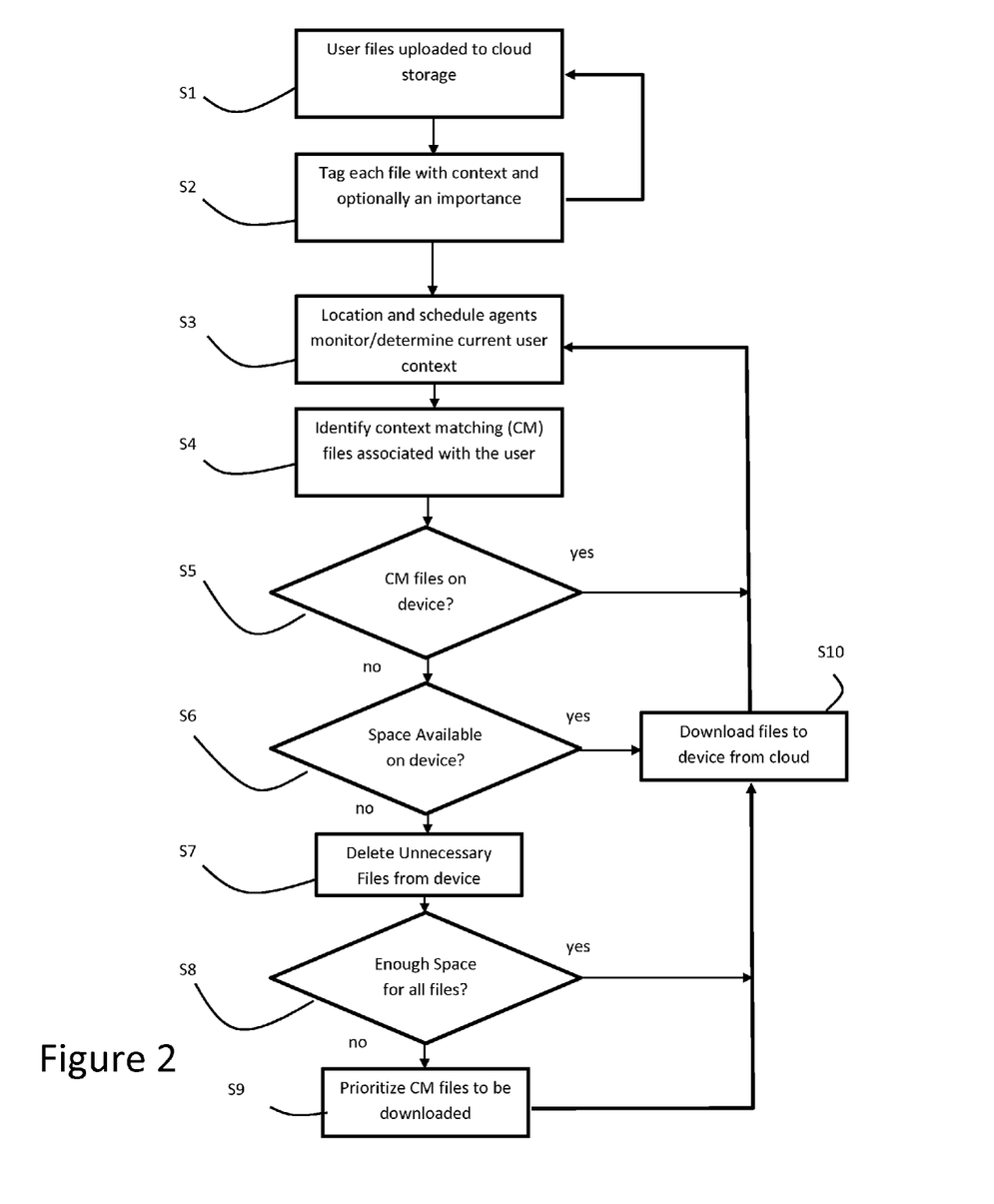
FIG. 2 shows a process flow for implementing context-based data storage management according to embodiments.

FIG. 2 depicts a flow diagram showing a method of implementing context-based data storage management (with reference to FIG. 1). At S1, user files are uploaded to cloud storage 32 and at S2, each file is tagged with a context and optionally, an importance. As noted, context may be determined at some level by a folder name a given file is stored in, e.g., business, university, gym, weekend, vacation, etc. Subfolders or other context information (e.g., metadata) may likewise be used to provide greater granularity to file context, e.g., client names, university class names, etc. "Importance" may for example be a number on a scale of 1-10 decided by the user 40. This process is repeated each time a new file is uploaded to cloud storage 32 by the user 40 or a process associated with the user 40.

Next, as S3, location agents 22 and schedule agents 24 monitor and determine a current user context, e.g., the user 40 is scheduled to go on vacation in one hour and is located at the airport. At S4, once the current user context is determined, context matching (CM) files associated with the user are identified. Context matching may be done in any manner. For example, natural language processing may be utilized to evaluate entries in a user's calendar to generate a list of terms (e.g., the entry for "vacation" may be used to generate a list of terms such as: travel, trip, tickets, reservations, hotels, airlines, etc.). The list of terms can then be matched against context terms or metadata associated with each user file 36.

Once a set of context matching (CM) files is identified, a determination is made whether the CM files already reside on the mobile device 10 at S5. If yes, the process repeats (e.g., every 30 minutes) and loops backs to S3. If no, a determination is made whether there is enough space one the mobile device 10 for each of the CM files. If there is enough space for all of the CM files, then the files are downloaded to the mobile device 10 at S10. If there is not enough space, unnecessary files are deleted from the mobile device 10 at S7 (as long as another instance of the unnecessary file resides on the cloud storage 32). At S8, a further check is made to see if there is enough space after the unnecessary files were deleted. If there is now enough space, all of the CM files are downloaded at S10. If there still is not enough space after files were deleted, the CM files are prioritized, e.g., based on the importance, size, create date, frequency of usage, internet connection speed, remaining battery, etc.

Figure 3:
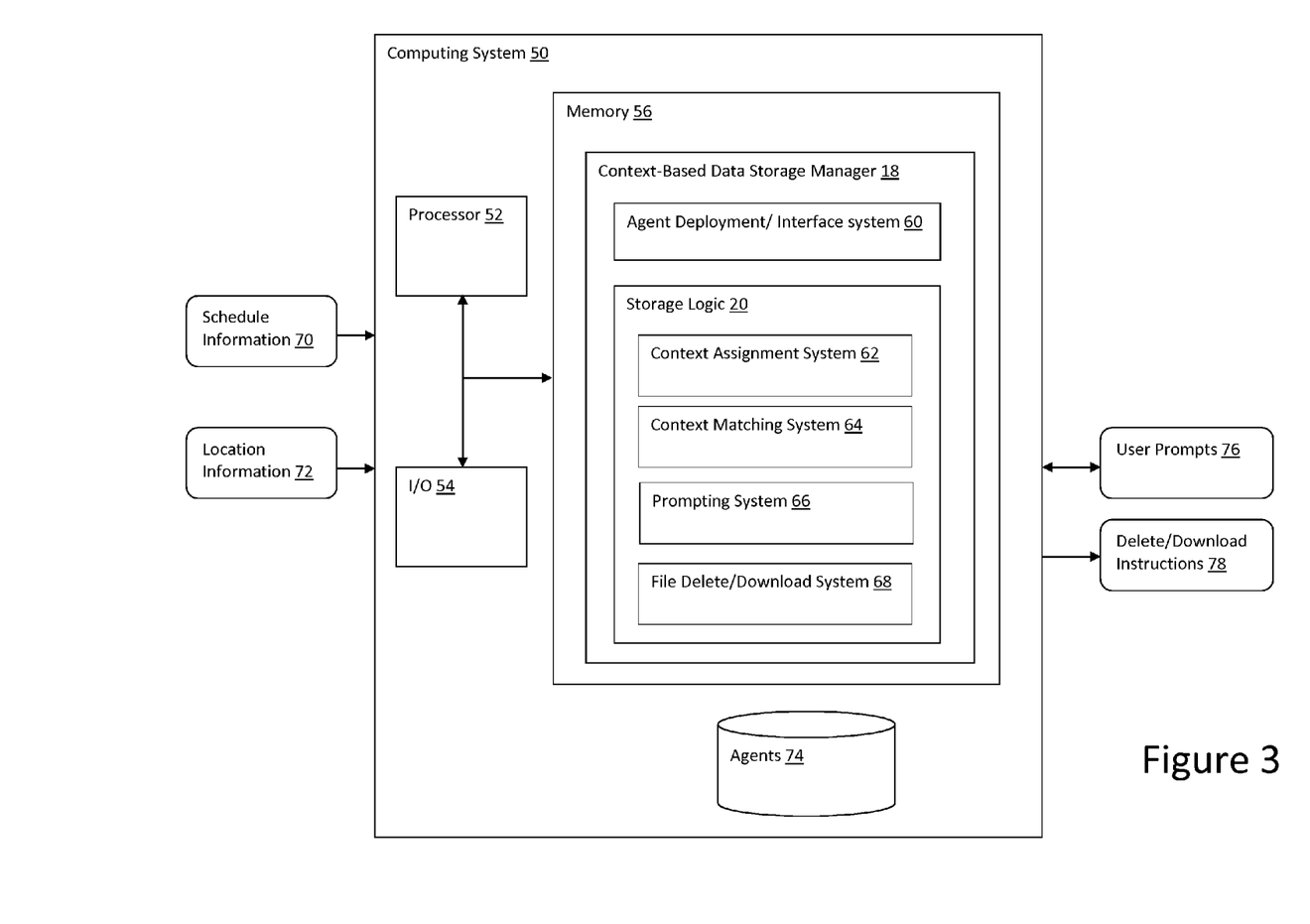
FIG. 3 shows a computer system having a context-based data storage manager according to embodiments.

FIG. 3 depicts an illustrative computing system 50 for implementing context-based data storage manager 18 (with reference to FIG. 1). Computing system 50 may for example be implemented on the mobile device 10, cloud platform 12, a third party system, or some combination thereof. In one illustrative embodiment, context-based data storage manager 18 utilizes a set of agents 74 to collect schedule information 70 and location information 72 about a user to create a current user context, and then generates delete and download instructions 78 to periodically update the user's mobile device with context matching (CM) files.

To achieve this, an agent deployment/interface system 60 is provided to deploy agents to one or both the mobile device 10 and the cloud platform 12. Once deployed, information is communicated with the deployed agents. Agents 74 may for example be deployed when the user downloads an App to the user's mobile device 10.

Storage logic 20 is responsible for implementing the rules and procedures that govern when files are to be deleted from and downloaded to the user's mobile device 10. In this illustrative embodiment, storage logic 20 includes a context assignment system 62 for assigning a context and other metadata (importance, frequency of use, etc.) to files being uploaded to the cloud platform 12. This may for example include a folder naming convention or taxonomy that dictates a context or set of contexts for files stored therein. Also included is a context matching system 64 that attempts to match a current user context (e.g., entries in a calendar, location of the user) with user files having a similar context.

Depending on the particular implementation, a prompting system 66 may be utilized to generate user prompts 76 for the end user 40. For instance, situations may arise where scheduling information 70 dictates that the user 40 is to be attending a business meeting at a determined location in 20 minutes, but the location information 72 indicates that the user 40 is not located anywhere near the determined location. In this case, prompting system 66 may generate a user prompt 76 asking the user 40 if CM files are still desired on the user's mobile device 10, even though it appears the user will not be attending the meeting.

File delete/download system 68 is responsible for employing strategies to determine when files should be deleted off of the user's mobile device 10 and when CM files should be downloaded. For example, if context matching system 64 identifies several CM files that require more space than is available on the mobile device 10, file delete/download system 68 will dictate rules for deleting files from the mobile device 10, e.g., only delete files that are also stored on the cloud, delete files that have not been used recently first, delete larger files before smaller files, etc. Depending on the amount of free space that can made available on the mobile device, file delete/download system 68 will also determine which CM files should be downloaded, e.g., download based on priority, size, etc. These strategies may be imparted into agents 74 that are deployed to the mobile device 10 and/or cloud platform 12, or specific instructions 78 may be sent to such agents 74 or relevant systems as needed.

Accordingly, by matching the user's schedule and location, it is possible to determine a current user context and have the manager 18 take the necessary actions to assure the required and most appropriate data will be available for each situation. Information about the location of the mobile device (e.g., using GPS) 10 will be updated periodically. The refresh rate in which the data will be updated (exchanged between cloud platform 12 and the device 10) can be set up by the user 40 (e.g., 30 minutes, 1 hour, etc.). The system 18 is responsible for removing data from the mobile device 10 and downloading from the cloud platform 12 the data that is relevant according to the context in which the mobile device 10 is at any moment.

Take as an example a user 40 who works as a sales representative during business hours visiting different customers and at the same time is a student who attends classes at night in a University. At 9 am, when the user's shift at work starts, the priority is to have information about the customers, reports, spreadsheets and documents related to the product and company. Therefore, the manager 18 will monitor the mobile device 10 in order to assure all the relevant files are available during the business hours and whether the device 10 has a proper amount of free storage space. Regularly, every morning the agents will confirm if the user is at the office and has the necessary data with him. Agents will also monitor the user's schedule to check which customers will be visited during the day. If any specific data for a particular customer is required, this information needs to be pre-uploaded by the user to the cloud platform, so the manager 18 is be able to guarantee it will be available whenever the user visits that customer.

If the user 40 has a meeting with a customer in the next 10 minutes and the mobile device 10 lacks some data that is present in the cloud platform 12 for that customer, the manager 18 automatically searches for data unrelated in context on the device 10, such as University related files (e-Books, documents and presentations), music, movies or any other information already stored in the cloud platform which is not relevant and delete it according to the size and relevancy, deleting the larger files with the least importance for the occasion, to make more space available. Then agents start downloading the required data from the cloud platform 12. The storage logic 20 considers the importance of the files, pre-evaluated by the user, their size, the internet connection speed and the battery left, so it starts downloading data with high importance that takes the least possible time.

The system 18 balances the time to make the file available for the user 40 with its importance, until all the data is downloaded. In case the connection to the internet is lost or the mobile device 10 runs out of battery, the manager 18 is able to resume the download or upload of data as soon as the internet connection is restored. Once the user 40 finishes the shift at work, the system will then prioritize University related files, as it is user's next appointment. At this time, the full priority is for study related files, such as class documents, slides presentations, e-Books and more. Accordingly, the agents 74 responsible for monitoring the user's calendar, schedule and location detect whether the time and place matches to assure the necessary data will be available. Similarly, if any required data is not present in the mobile device, the system will automatically work as described to make the study related files available for the user in due time.

In one illustrative embodiment, the process may be implemented as a multi-agent system, based on cloud computing. On the server (i.e., cloud platform 12) side, a first agent (agent A) is responsible for monitoring files at the cloud storage 32 and preparing packages to send to the mobile device 10 when required. Cloud storage 32 uses a folder-based structure and a tagging system to determine the context of the data, so it can easily prepare packages to be downloaded according to the each situation. Also, this agent A checks what is the size and importance of all the data to be sent to the mobile device 10 to prioritize and determine the order the packages will be transferred.

On the client side (mobile device 10), another pair of agents (agents B and C) monitor the user's schedule and location (e.g., based on GPS technology), respectively. According to the user's appointments and current location, agents B and C are able to determine what kind of data will likely to be required. In case this data is not available in the device 10 at the moment, a request is made to the cloud storage 32 so the necessary files can be downloaded. These agents are responsible for checking if the user 40 is at the right place (Agent C) and in the right time according to the user's calendar and schedule (Agent B), in order to confirm if the current user context matches what was scheduled.

The following steps may thus be employed:

(1) Agent B monitors user's calendar and schedule to keep track of user appointments to find the current or upcoming user context.

(2) Agent B then checks with Agent C to identify user's current location to confirm if the current user context matches what is expected.

(3) If the user location is changing and the new location is known and also matches the location specified in the calendar (i.e., where the user is supposed to be at a given time), then Agent C sends a confirmation to Agent B. If the user's location is changing and the new location is not known or does not match the location in the calendar, then a prompt message is shown and the user has to confirm whether to change any data on the mobile device. Agent C then sends a notification to Agent B with that information. If it is positive, an alert is sent to Agent A on the cloud storage to prepare data to be sent to the mobile device. If it is negative, then nothing is to be done. Optionally, the user can set this option to a "non-prompt" mode and the data will be transferred automatically without user confirmation. This is particularly useful if the user is aware of a possible change to the location a particular meeting will take place.

(4) Once the verification is done for both Agent B and C and it is confirmed that the current user context matches with the schedule entry, or if the user confirms the files should be available anyway, another verification is done to check if the required files are already in the device.

(5) In case the data is already available locally in the device, no further action is required. But if it is not, a notification is sent to agent A based which prepares the packages to send to the mobile device.

(6) Agent C checks if there is a reasonable amount of free space in the device. It may not be necessary to delete any files, but in case the usage level is over a certain value (70%, for example), some files will have to be deleted. The files to be deleted must already be stored in cloud storage and verification may be done before proceeding with the process. The system may for example remove bigger files with least importance for that context.

(7) Once enough free space is available, the last step is to have the required files downloaded. For this, the system will evaluate the files and create a priority list based on, e.g., the size of the files, their importance, user's internet connection at the moment and the amount of battery left in the cellphone in order to optimize the process. This process can take advantage of known solutions, such as that taught by US Patent Publication 2011/0307573, "Optimizing storage between mobile devices and cloud storage providers," which is hereby incorporated by reference.

Context-based data storage manager 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 3 depicts an illustrative computing system 50 that may comprise any type of computing device and, for example includes at least one processor 52, memory 56, an input/output (I/O) 54 (e.g., one or more I/O interfaces and/or devices), and a communications pathway. In general, processor(s) 52 execute program code which is at least partially fixed in memory 56. While executing program code, processor(s) 52 can process data, which can result in reading and/or writing transformed data from/to memory and/or I/O 54 for further processing. The pathway provides a communications link between each of the components in computing system 50. I/O 54 can comprise one or more human I/O devices, which enable a user to interact with computing system 50.

Furthermore, it is understood that the context-based data storage manager 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will, select the proxy server code, determine on which computers to place the proxy servers' code, transmit the proxy server code, then install the proxy server code on the proxy computer. The components will be transmitted to the proxy server and then it will be stored on the proxy server.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A context-based data storage management system, comprising:
   a system for assigning context to user files stored in a network provisioning platform;
   a system for periodically analyzing schedule information and location information associated with a user to determine a current user context;
   a system for matching the current user context with user files stored in the network provisioning platform to identify a set of context matching files;
   a system for periodically downloading context matching files from the network provisioning platform to a mobile device associated with the user;
   a system for determining if the mobile device has enough free space to download the context matching files; and
   a system for automatically deleting files from the mobile device to create more free space if the system for determining determines that the mobile device does not have enough space to download the context matching files and another instance of the deleted files is stored in the network provisioning platform.

2. The system of claim 1, further comprising a system for prioritizing context matching files for download to the mobile device.

3. The system of claim 2, wherein the system for prioritizing includes analyzing at least one of: an assigned importance, amount of free space available, amount of battery life remaining, and network conditions.

4. The system of claim 1, further comprising a system for generating an alert or prompt when a context matching file is to be downloaded.

5. The system of claim 1, further comprising a system for deploying agents to run on both the mobile device and network provisioning platform.

6. A computer program product stored on a non-transitory computer readable storage medium, which when executed by a computer system, provides context-based data storage management between a network provisioning platform and a mobile device, comprising:
   program instructions for assigning context to user files stored in the network provisioning platform;
   program instructions for periodically analyzing schedule information and location information associated with a user to determine a current user context;
   program instructions for matching the current user context with user files stored in the network provisioning platform to identify a set of context matching files;
   program instructions for periodically downloading context matching files from the network provisioning platform to the mobile device associated with the user;
   program instructions for determining if the mobile device has enough free space to download the context matching files; and
   program instructions for automatically deleting files from the mobile device to create more free space if the program instructions for determining determines that the mobile device does not have enough space to download the context matching files and another instance of the deleted files is stored in the network provisioning platform.

7. The program product of claim 6, further comprising program instructions for prioritizing context matching files for download to the mobile device.

8. The program product of claim 7, wherein the program instructions for prioritizing includes analyzing at least one of: an assigned importance, amount of free space available, amount of battery life remaining, and network conditions.

9. The program product of claim 6, further comprising a system for generating an alert or prompt when a context matching file is to be downloaded.

10. The program product of claim 6, further comprising a system for deploying agents to run on at least one of the mobile device and network provisioning platform.

11. A method of providing context-based data storage management between a network provisioning platform and a mobile device, comprising:
    assigning context to user files stored in the network provisioning platform;
    periodically analyzing schedule information and location information associated with a user to determine a current user context;
    matching the current user context with user files stored in the network provisioning platform to identify a set of context matching files;
    periodically downloading context matching files from the network provisioning platform to the mobile device associated with the user;
    determining if the mobile device has enough free space to download the context matching files; and
    automatically deleting files from the mobile device to create more free space if it is determined that the mobile device does not have enough space to download the context matching files and another instance of the deleted files is stored in the network provisioning platform.

12. The method of claim 11, further comprising prioritizing context matching files for download to the mobile device.

13. The method of claim 12, wherein prioritizing includes analyzing at least one of: an assigned importance, amount of free space available, amount of battery life remaining, and network conditions.

14. The method of claim 11, further comprising generating an alert or prompt when a context matching file is to be downloaded.

* * * * *